(12) United States Patent
Otani

(10) Patent No.: US 11,379,083 B2
(45) Date of Patent: Jul. 5, 2022

(54) POSITION DETECTION DEVICE, PROJECTOR, AND POSITION DETECTION METHOD

(71) Applicant: SEIKO EPSON CORPORATION, Tokyo (JP)

(72) Inventor: Makoto Otani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 69 days.

(21) Appl. No.: 17/032,242

(22) Filed: Sep. 25, 2020

(65) Prior Publication Data

US 2021/0096689 A1     Apr. 1, 2021

(30) Foreign Application Priority Data

Sep. 27, 2019   (JP) .............. JP2019-176763

(51) Int. Cl.
    *G06F 3/042*     (2006.01)
    *H04N 5/225*     (2006.01)
    *G06T 7/70*     (2017.01)
    *H04N 9/31*     (2006.01)
    *H04N 5/247*     (2006.01)

(52) U.S. Cl.
    CPC .............. *G06F 3/0421* (2013.01); *G06T 7/70* (2017.01); *H04N 5/2256* (2013.01); *H04N 5/247* (2013.01); *H04N 9/31* (2013.01); *G06T 2207/10048* (2013.01); *G06T 2207/10152* (2013.01); *G06T 2207/30196* (2013.01)

(58) Field of Classification Search
    CPC ...... H04N 5/2256; H04N 9/3179; H04N 9/31; H04N 9/3194; H04N 5/247; H04N 5/232; H04N 5/2258; G06T 7/73; G06T 7/70; G06T 2200/24; G06T 2207/30196; G06T 2207/10152; G06T 2207/10048; G06F 3/0421
    See application file for complete search history.

(56) References Cited

U.S. PATENT DOCUMENTS

| 11,073,949 | B2* | 7/2021 | Otani | G06F 3/04845 |
| 2014/0253512 | A1* | 9/2014 | Narikawa | G06F 3/0304 |
| | | | | 345/175 |
| 2014/0253513 | A1* | 9/2014 | Matsubara | G06F 3/0425 |
| | | | | 345/175 |
| 2016/0274691 | A1* | 9/2016 | Murase | G06F 3/042 |

(Continued)

FOREIGN PATENT DOCUMENTS

JP     2017-062813 A     3/2017

*Primary Examiner* — Vinh T Lam
(74) *Attorney, Agent, or Firm* — Dority & Manning, P.A.

(57) ABSTRACT

A projector includes: an illumination device casting one detection light and another detection light onto an operation surface; a first image pickup device having a higher sensitivity to the one detection light than to the another detection light; a second image pickup device different from the position of the first image pickup device, the second image pickup device having a higher sensitivity to the another detection light than to the one detection light; and a detection device detecting that an object is in contact with the operation surface when a position of a pointing unit specified based on a first picked-up image picked up using the first image pickup device and a position of the pointing unit specified based on a second picked-up image picked up using the second image pickup device are within a predetermined range.

9 Claims, 11 Drawing Sheets

(56) References Cited

U.S. PATENT DOCUMENTS

| | | | |
|---|---|---|---|
| 2018/0046369 A1* | 2/2018 | Takano | G06F 3/04845 |
| 2020/0241697 A1* | 7/2020 | Ikeda | G06F 3/0304 |
| 2021/0096689 A1* | 4/2021 | Otani | H04N 5/2256 |
| 2021/0255718 A1* | 8/2021 | Kitazawa | G06T 7/593 |

* cited by examiner

POSITION DETECTION DEVICE, PROJECTOR, AND POSITION DETECTION METHOD

The present application is based on, and claims priority from JP Application Serial Number 2019-176763, filed Sep. 27, 2019, the disclosure of which is hereby incorporated by reference herein in its entirety.

BACKGROUND

1. Technical Field

The present disclosure relates to a position detection device, a projector, and a position detection method.

2. Related Art

There is an interactive projector configured to project a projection image onto a screen and also to pick up an image including a pointing unit such as a finger with a camera and detect the position of the pointing unit, using the picked-up image. JP-A-2017-62813 discloses a projector which has two illumination devices casting light of different wavelengths from each other onto an operation surface and a camera having a sensitivity to each of the wavelengths, separates a shadow formed via each illumination device based on the density of the shadow in a picked-up image picked up by the camera, and determines a touch by the pointing unit on the screen, based on the separated shadow.

However, the related art has a problem in that the shadow of the pointing unit is erroneously determined as the pointing unit due to the difficulty in discriminating the shadow of the pointing unit from the pointing unit, and a problem in that the accuracy of detecting the position of the pointing unit is not necessarily sufficient, when the shadow of the pointing unit and the pointing unit overlap each other and the boundary between the pointing unit and the shadow cannot be determined.

SUMMARY

A position detection device according to an aspect of the present disclosure includes: an illumination device casting first light and second light that is different from the first light, onto an operation surface and an object; a first image pickup device picking up an image of the operation surface and the object and having a higher sensitivity to the first light than to the second light; a second image pickup device picking up an image of the operation surface and the object and arranged at a different position from the first image pickup device, the second image pickup device having a higher sensitivity to the second light than to the first light; and a detection device detecting that the object is in contact with the operation surface when a position of the object specified based on a first picked-up image picked up using the first image pickup device and a position of the object specified based on a second picked-up image picked up using the second image pickup device are within a predetermined range.

A projector according to another aspect of the present disclosure includes: an illumination device casting first light and second light that is different from the first light, onto an operation surface and an object; a first image pickup device picking up an image of the operation surface and the object and having a higher sensitivity to the first light than to the second light; a second image pickup device picking up an image of the operation surface and the object and arranged at a different position from the first image pickup device, the second image pickup device having a higher sensitivity to the second light than to the first light; a detection device detecting that the object is in contact with the operation surface when a position of the object specified based on a first picked-up image picked up using the first image pickup device and a position of the object specified based on a second picked-up image picked up using the second image pickup device are within a predetermined range; and a projection device projecting a projection image via visible light onto the operation surface.

A position detection method according to another aspect of the present disclosure includes: casting first light and second light that is different from the first light, onto an operation surface and an object; picking up an image of the operation surface and the object by a first image pickup device having a higher sensitivity to the first light than to the second light, and picking up an image of the operation surface and the object by a second image pickup device having a higher sensitivity to the second light than to the first light, from a different direction from a position of the first image pickup device; and detecting that the object is in contact with the operation surface when a position of the object specified based on a first picked-up image picked up using the first image pickup device and a position of the object specified based on a second picked-up image picked up using the second image pickup device are within a predetermined range.

DESCRIPTION OF EXEMPLARY EMBODIMENTS

Embodiments will now be described with reference to the drawings. In the illustrations, the dimension and scale of each part is made different from reality according to need. While the embodiments described below include various technically preferable limitations, the embodiments are not limited to these configurations.

1. First Embodiment

Figure 1:
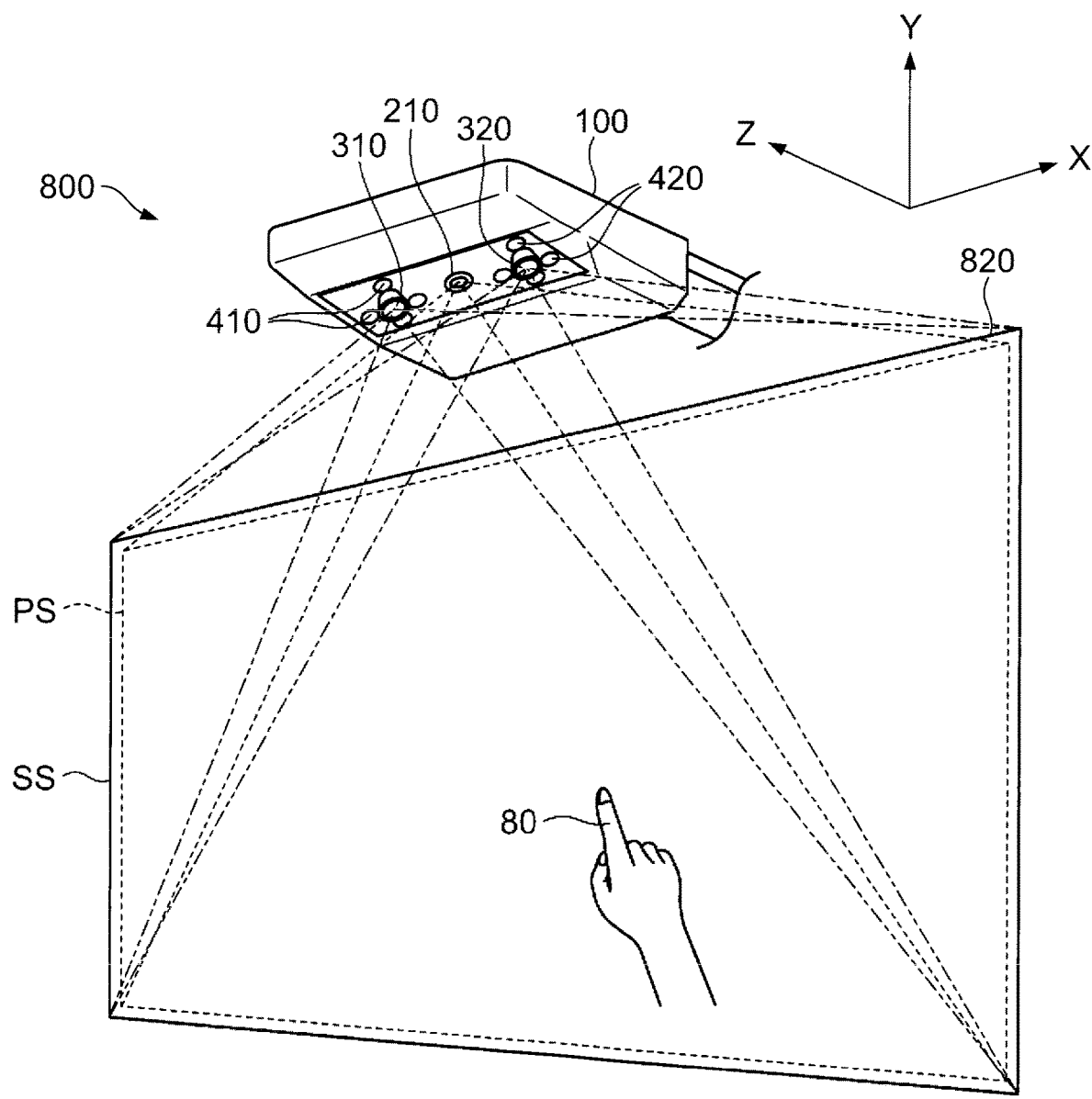
FIG. 1 is a perspective view of an interactive projection system including a projector according to a first embodiment of the present disclosure.

FIG. 1 is a perspective view of an interactive projection system 800 having a projector 100 according to a first embodiment of the present disclosure. The interactive projection system 800 has the projector 100, which is an interactive projector, and a screen board 820. A front surface of the screen board 820 is utilized as an operation surface SS used to input an instruction using a pointing unit 80. The operation surface SS is also utilized as a projection surface where a projection image PS is projected. The projector 100 is fixed to a wall surface or the like. The projector 100 is installed in front of and above the screen board 820. In FIG. 1, the operation surface SS is vertically arranged. However, the operation surface SS may be horizontally arranged. In FIG. 1, the direction to the front of the screen board 820 is a Z-direction. The upward direction is a Y-direction. The direction to the right is an X-direction. For example, when Z=0, a position within the plane of the operation surface SS is expressed by a two-dimensional coordinate system (X, Y).

The projector 100 has a projection lens 210 projecting an image onto the screen board 820, a first image pickup device 310 and a second image pickup device 320 picking up an image including the pointing unit 80, a first illumination device 410 corresponding to the first image pickup device 310, and a second illumination device 420 corresponding to the second image pickup device 320.

The first illumination device 410 and the second illumination device 420 cast detection light for detecting the pointing unit 80 onto the operation surface SS. The first illumination device 410 casts first infrared light having a wavelength belonging to a first wavelength range onto the operation surface SS, as the detection light for detecting the pointing unit 80. The second illumination device 420 casts second infrared light having a wavelength belonging to a second wavelength range that is different from the first wavelength range onto the operation surface SS, as the detection light for detecting the pointing unit 80. In this embodiment, the wavelength of the first infrared light cast on the operation surface SS by the first illumination device 410 is 940 nm, and the wavelength of the second infrared light cast on the operation surface SS by the second illumination device 420 is 850 nm. The first infrared light cast on the operation surface SS by the first illumination device 410 is an example of the first light according to the present disclosure. The second infrared light cast on the operation surface SS by the second illumination device 420 is an example of the second light according to the present disclosure. Although infrared light is used as the detection light in this embodiment, other light than infrared light, such as visible light, may be used as the detection light. When visible light is used as the detection light, preferably, the interactive projection system 800 is configured not to lower the display quality of the projection image PS.

The projection lens 210 projects the projection image PS onto the operation surface SS. The projection image PS includes an image drawn within the projector 100. When there is no image drawn in the projector 100, light is cast onto the operation surface SS from the projector 100 and this light displays a white image. In this specification, the "operation surface SS" means a surface used to input an instruction using the pointing unit 80. The "projection image PS" means an area of an image projected on the operation surface SS by the projector 100.

In the interactive projection system 800 shown in FIG. 1, one or a plurality of non-light-emitting pointing units are available. As the pointing unit 80, a non-light-emitting object such as a finger of the user of the interactive projection system 800 or a pen can be used. When a non-light-emitting object is used as the pointing unit 80, preferably, the tip of the pointing unit 80 has highly reflective to infrared light and is also retroreflective.

The first image pickup device 310 is arranged at such a position as to be able to pick up an image of the entirety of the operation surface SS. The second image pickup device 320 is arranged at such a position as to be able to pick up an image of the entirety of the operation surface SS and that is different from the first image pickup device 310. The first image pickup device 310 and the second image pickup device 320 have the function of respectively picking up an image of the pointing unit 80 at the backdrop of the operation surface SS. The first image pickup device 310 and the second image pickup device 320 can pick up an image in different wavelength ranges from each other, when a filter or the like is installed thereon. Specifically, the first image pickup device 310 has a higher sensitivity to the light in the first wavelength range than to the light in the second wavelength range. The second image pickup device 320 has a higher sensitivity to the light in the second wavelength range than to the light in the first wavelength range.

The first image pickup device 310 receives reflected light of the first light reflected off the operation surface SS or the pointing unit 80, of the reflected light of the first light cast from the first illumination device 410 and the second light cast from the second illumination device 420, and thus generates a first picked-up image including the pointing unit 80. The second image pickup device 320 receives reflected light of the second light reflected off the operation surface SS or the pointing unit 80, of the reflected light of the first light cast from the first illumination device 410 and the second light cast from the second illumination device 420, and thus generates a second picked-up image including the pointing unit 80. Both of the first picked-up image and the second picked-up image are infrared light images. In these images, the pointing unit 80 is detected as a bright spot that is brighter than the operation surface SS.

Figure 2:
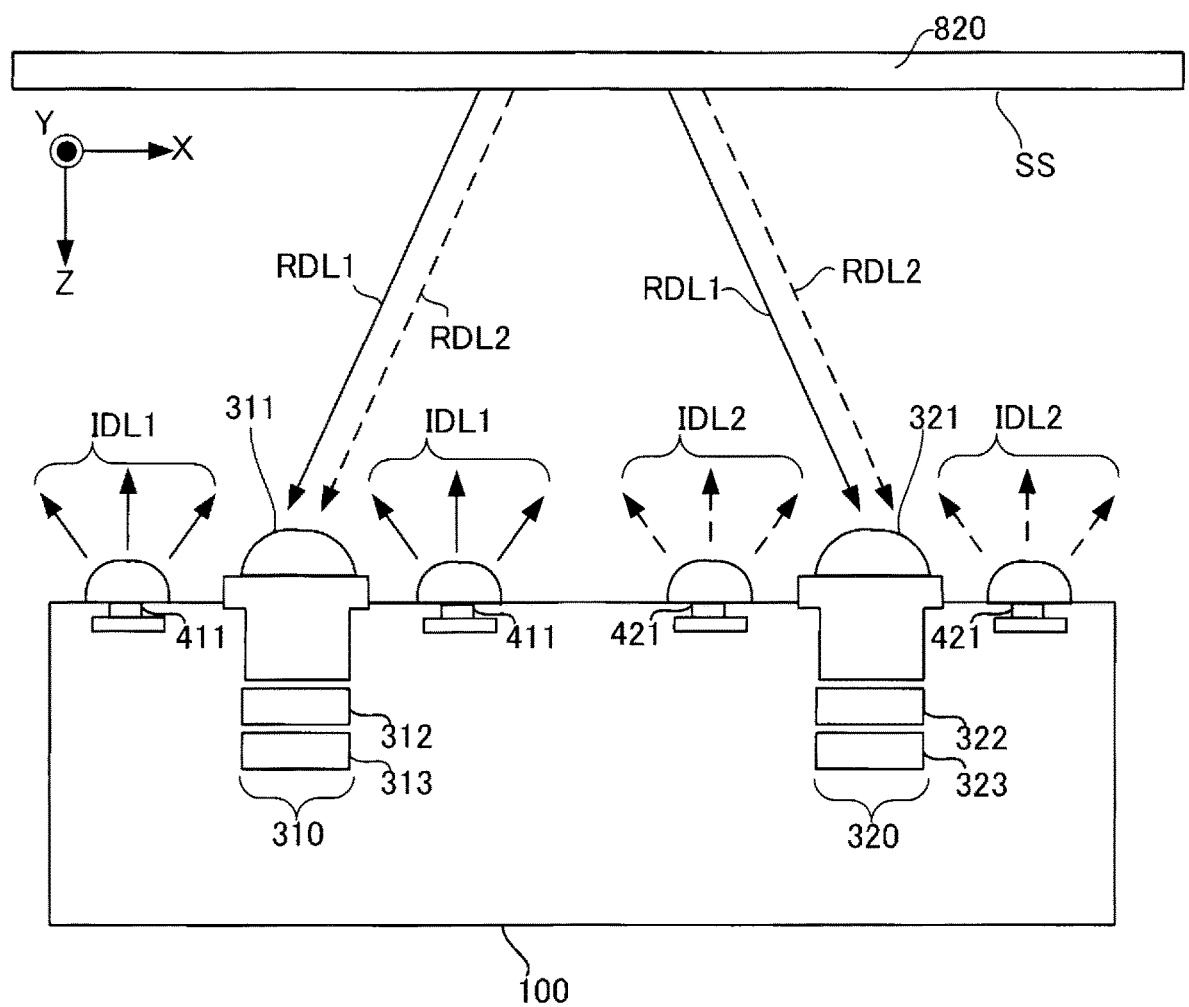
FIG. 2 shows a configuration example of a first image pickup device and a second image pickup device.

FIG. 2 shows a configuration example of the first image pickup device 310 and the second image pickup device 320. FIG. 2 also illustrates two of four illumination elements 411 included in the first illumination device 410, two of four illumination elements 421 included in the second illumination device 420, and the screen board 820, in addition to the first image pickup device 310 and the second image pickup device 320. As shown in FIG. 2, the first image pickup device 310 has a first image pickup lens 311, a first filter 312, and a first camera 313. The second image pickup device 320 has a second image pickup lens 321, a second filter 322, and a second camera 323. The first filter 312 is a band-pass filter which transmits the light in the first wavelength range, of the light transmitted through the first image pickup lens 311, and does not transmit the light in the second wavelength range. That is, the first filter 312 transmits reflected light RDL1 of the light in the first wavelength range reflected off the operation surface SS or the pointing unit 80 and does not transmit reflected light RDL2 of the light in the second wavelength range reflected off the operation surface SS or the pointing unit 80. The first camera 313 picks up an image of the operation surface SS via the first filter 312 and thus outputs the first picked-up image. The second filter 322 is a band-pass filter which transmits the light in the second wavelength range, of the light transmitted through the second image pickup lens 321, and does not transmit the light in the first wavelength range. That is, the second filter 322 transmits the reflected light RDL2 and does not transmit the reflected light RDL1. The second camera 323 is arranged at a different position from the first camera 313 and picks up an image of the operation surface SS via the second filter 322 and thus outputs the second picked-up image. In this embodiment, the first filter 312 transmits the first infrared light having the wavelength of 940 nm and does not transmit the second infrared light having the wavelength of 850 nm. The second filter 322 transmits the second infrared light having the wavelength of 850 nm and does not transmit the first infrared light having the wavelength of 940 nm.

Figure 3:
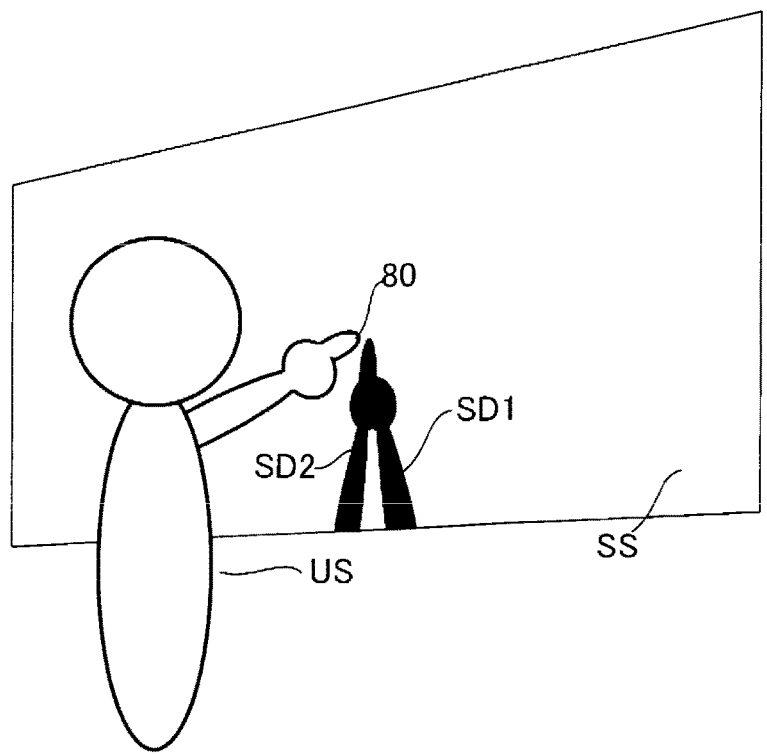
FIG. 3 shows an example of a subject for the first image pickup device and the second image pickup device.

For example, it is now assumed that the first image pickup device 310 and the second image pickup device 320 pick up an image of the state where a user US of the interactive projection system 800 gives a certain instruction on the operation surface SS with his or her finger as the pointing unit 80, as shown in FIG. 3. In this case, if the first filter 312 and the second filter 322 are not provided, a shadow SD1 of the pointing unit 80 formed by detection light IDL1 cast from the first illumination device 410 and a shadow SD2 of the pointing unit 80 formed by detection light IDL2 cast from the second illumination device 420 can appear in the first picked-up image and the second picked-up image, respectively. A shadow refers to an area where the luminance is less than a predetermined threshold.

Figure 4:
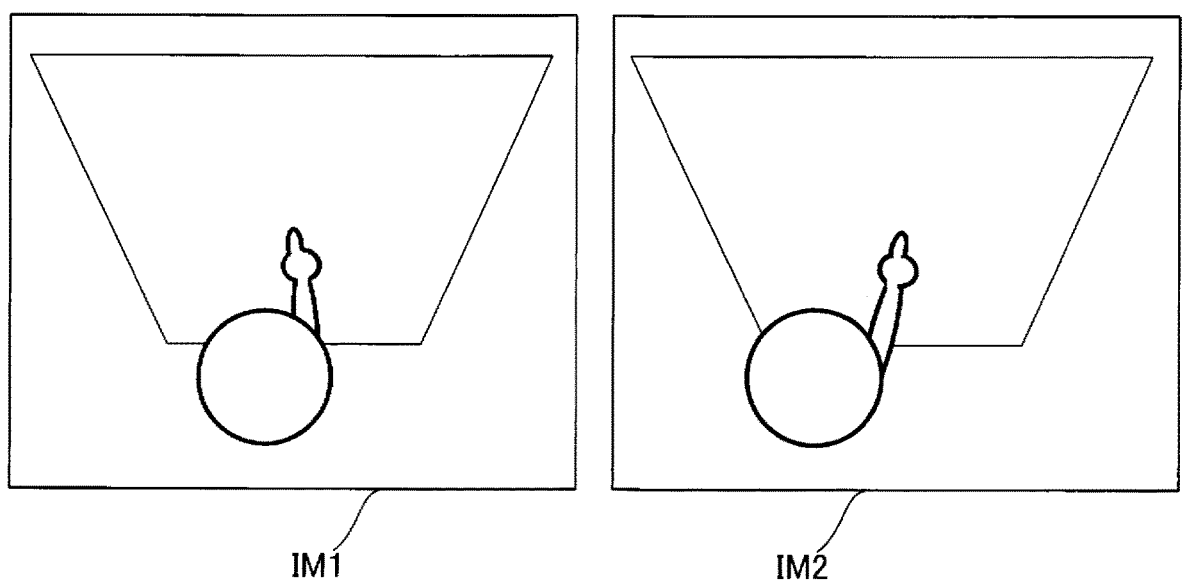
FIG. 4 shows an example of a first picked-up image by the first image pickup device and an example of a second picked-up image by the second image pickup device.

However, in this embodiment, the first image pickup device 310 is provided with the first filter 312, which transmits the reflected light RDL1 and does not transmit the reflected light RDL2. Therefore, only the reflected light RDL1 becomes incident on the first camera 313 of the first image pickup device 310. As shown in FIG. 4, in a first picked-up image IM1 by the first image pickup device 310, only the shadow SD1 appears and the shadow SD2 does not appear. Similarly, the second image pickup device 320 is provided with the second filter 322, which transmits the reflected light RDL2 and does not transmit the reflected light RDL1. Therefore, as shown in FIG. 4, in a second picked-up image IM2 by the second image pickup device 320, only the shadow SD2 appears and the shadow SD1 does not appear. Also, the first image pickup device 310 picks up an image from the direction of casting the detection light IDL1 and therefore cannot detect the shadow SD1 at the position of contact between the pointing unit 80 and the operation surface SS, in the first picked-up image IM1. The second image pickup device 320 picks up an image from the direction of casting the detection light IDL2 and therefore cannot detect the shadow SD2 at the position of contact between the pointing unit 80 and the operation surface SS, in the second picked-up image IM2.

Figure 5:
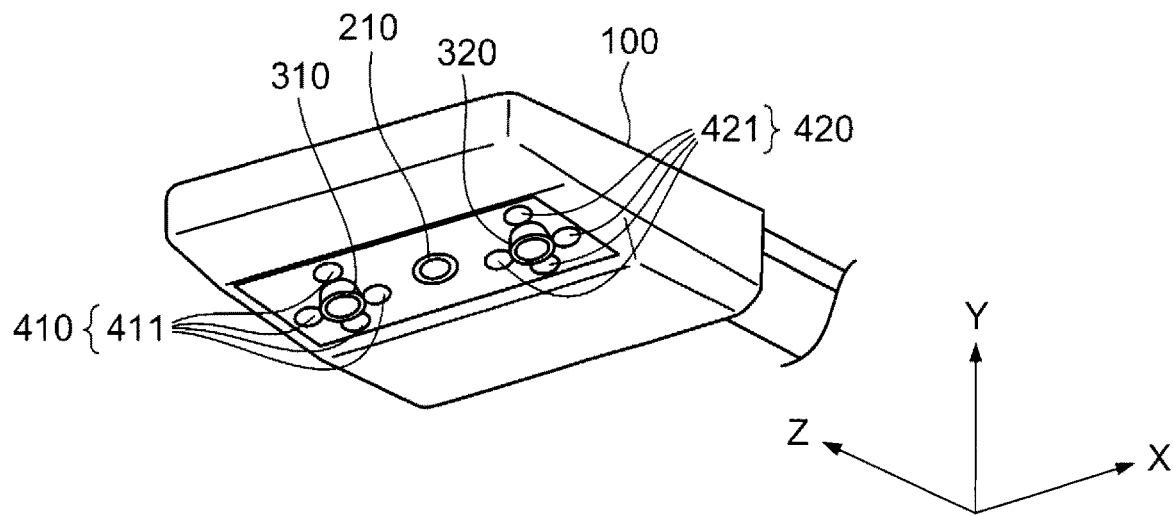
FIG. 5 is an enlarged view of the projector.

The first illumination device 410 has the function of a first ambient illumination device illuminating the surroundings of the optical axis of the first image pickup device 310 with infrared light. That is, the first illumination device 410 casts the first infrared light along the optical axis of the first image pickup device 310 and does not cast the second infrared light. FIG. 5 is an enlarged view of the projector 100. As shown in FIG. 5, in the projector 100 in this embodiment, the first illumination device 410 includes the four illumination elements 411 arranged in such a way as to surround the first image pickup device 310. The purpose of arranging the four illumination elements 411 in such a way as to surround the first image pickup device 310 is to minimize the generation of a shadow of the pointing unit 80 when the first image pickup device 310 picks up an image of the pointing unit 80. The second illumination device 420 includes the four illumination elements 421 arranged in such a way as to surround the second image pickup device 320. The second illumination device 420 has a configuration and function similar to the first illumination device 410 and has the function of a second ambient illumination device illuminating the surroundings of the optical axis of the second image pickup device 320 with infrared light. That is, the second illumination device 420 casts the second infrared light along the optical axis of the second image pickup device 320 and does not cast the first infrared light.

Figure 7:
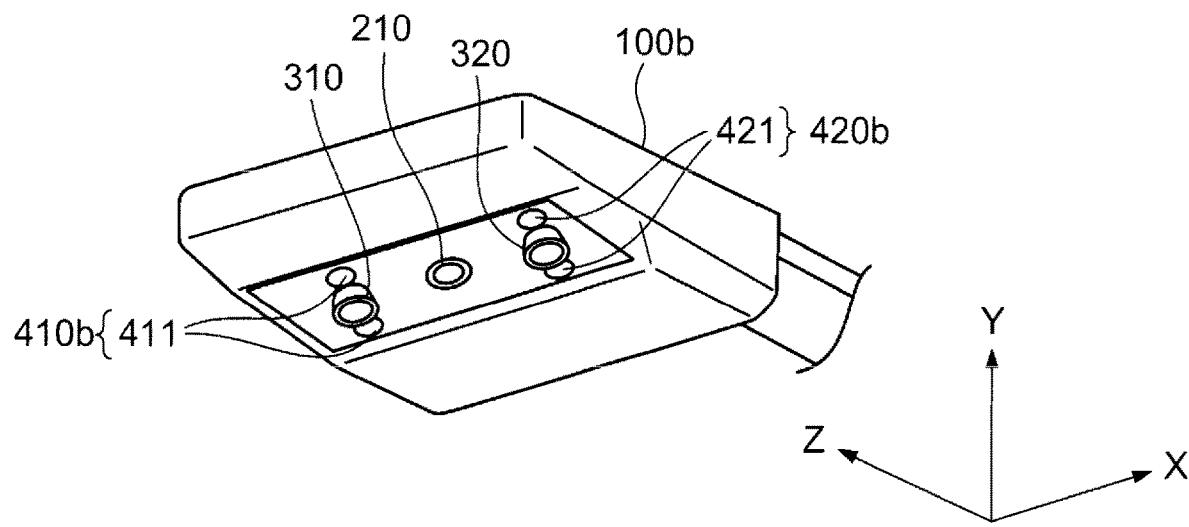
FIG. 7 shows still another example of the first illumination device and the second illumination device.
Figure 8:
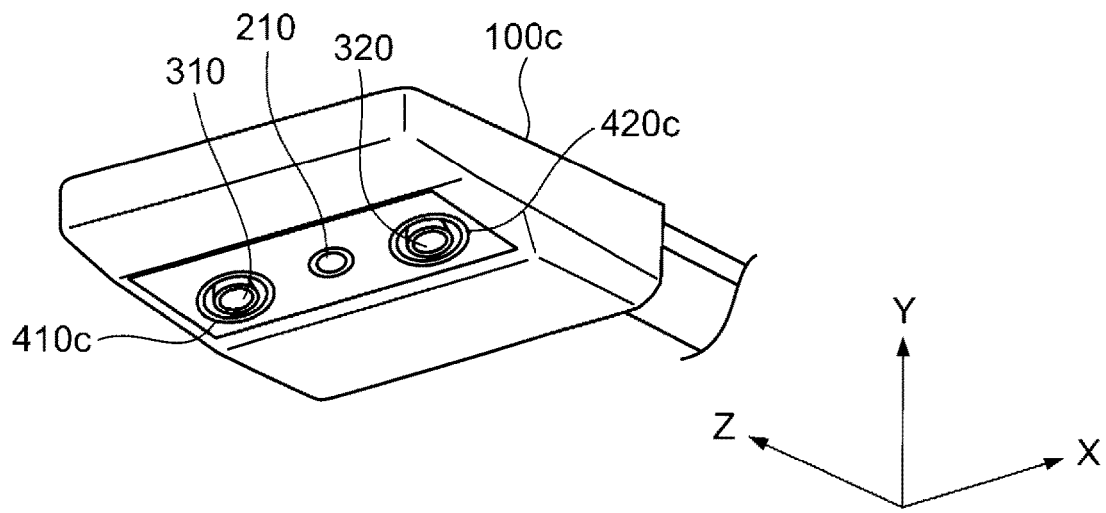
FIG. 8 shows still another example of the first illumination device and the second illumination device.

The number of illumination elements 411 included in the first illumination device 410 is not limited to four and may be any number equal to or greater than two. However, preferably, the plurality of illumination elements 411 forming the first illumination device 410 are arranged at rotationally symmetrical positions about the first image pickup device 310. Also, instead of using the plurality of illumination elements 411, a ring-shaped illumination element may be used to form the first illumination device 410. Moreover, an illumination device emitting the first infrared light via the image pickup lens of the first image pickup device 310 may be used as the first illumination device 410. These modification examples can also be applied to the second illumination device 420. These examples are shown in FIGS. 6 to 8.

Figure 6:
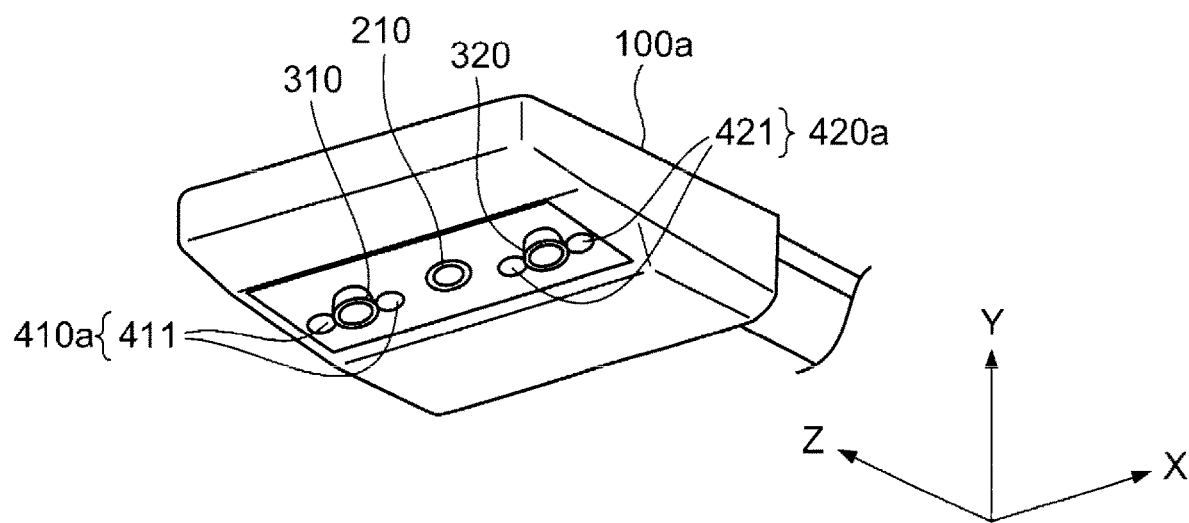
FIG. 6 shows another example of a first illumination device and a second illumination device.

A projector 100a shown in FIG. 6 has a first illumination device 410a where two illumination elements 411 are arranged at symmetrical positions along the X-direction about the first image pickup device 310, and a second illumination device 420a where two illumination elements 421 are arranged at symmetrical positions along the X-direction about the second image pickup device 320. A projector 100b shown in FIG. 7 has a first illumination device 410b where two illumination elements 411 are arranged at symmetrical positions along the Z-direction about the first image pickup device 310, and a second illumination device 420b where two illumination elements 421 are arranged at symmetrical positions along the Z-direction about the second image pickup device 320. A projector 100c shown in FIG. 8 has a first illumination device 410c arranged in such a way as to surround the optical axis of the first image pickup device 310, and a second illumination device 420c arranged in such a way as to surround the optical axis of the second image pickup device 320. The first illumination device 410c functions as a first coaxial illumination device illuminating with the first light coaxial with the optical axis of the first image pickup device 310. The second illumination device 420c functions as a second coaxial illumination device illuminating with the second light coaxial with the optical axis of the second image pickup device 320.

Figure 9:
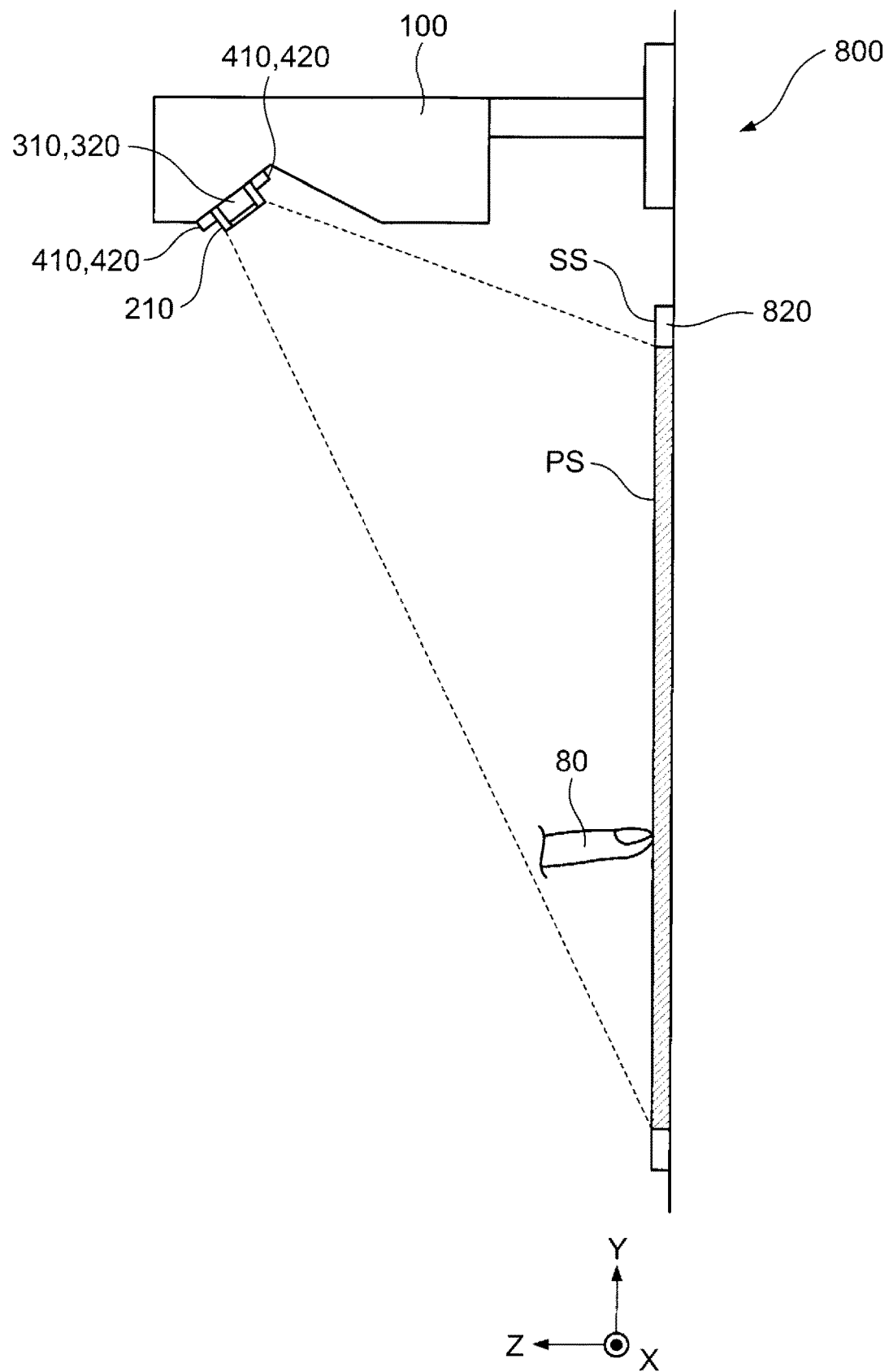
FIG. 9 is a side view of the interactive projection system.

FIG. 9 is a side view of the interactive projection system 800. In this specification, as shown in FIG. 1, the direction from the left end toward the right end of the operation surface SS is defined as the X-direction. The direction from the bottom end toward the top end of the operation surface SS is defined as the Y-direction. The direction along the normal line to the operation surface SS is defined as the Z-direction. In FIG. 9, for the sake of convenience of illustration, the range of the projection image PS on the screen board 820 is hatched. The coordinate position on the operation surface SS where the projection image PS is projected can be detected as two-dimensional coordinates in a two-dimensional coordinate system (X, Y), for example, where Z=0. A two-dimensional coordinate system (V, U) of the first picked-up image by the first image pickup device 310 and a two-dimensional coordinate system (η, ξ) of the second picked-up image by the second image pickup device 320 are different from each other due to the arrangement and characteristics of the first image pickup device 310 and the second image pickup device 320 and are also different from the coordinate system (X, Y) of the projection image PS and the operation surface SS. A conversion coefficient or the like for these coordinate systems is found by calibration processing and this enables these coordinate systems to correspond to each other.

Figure 10:
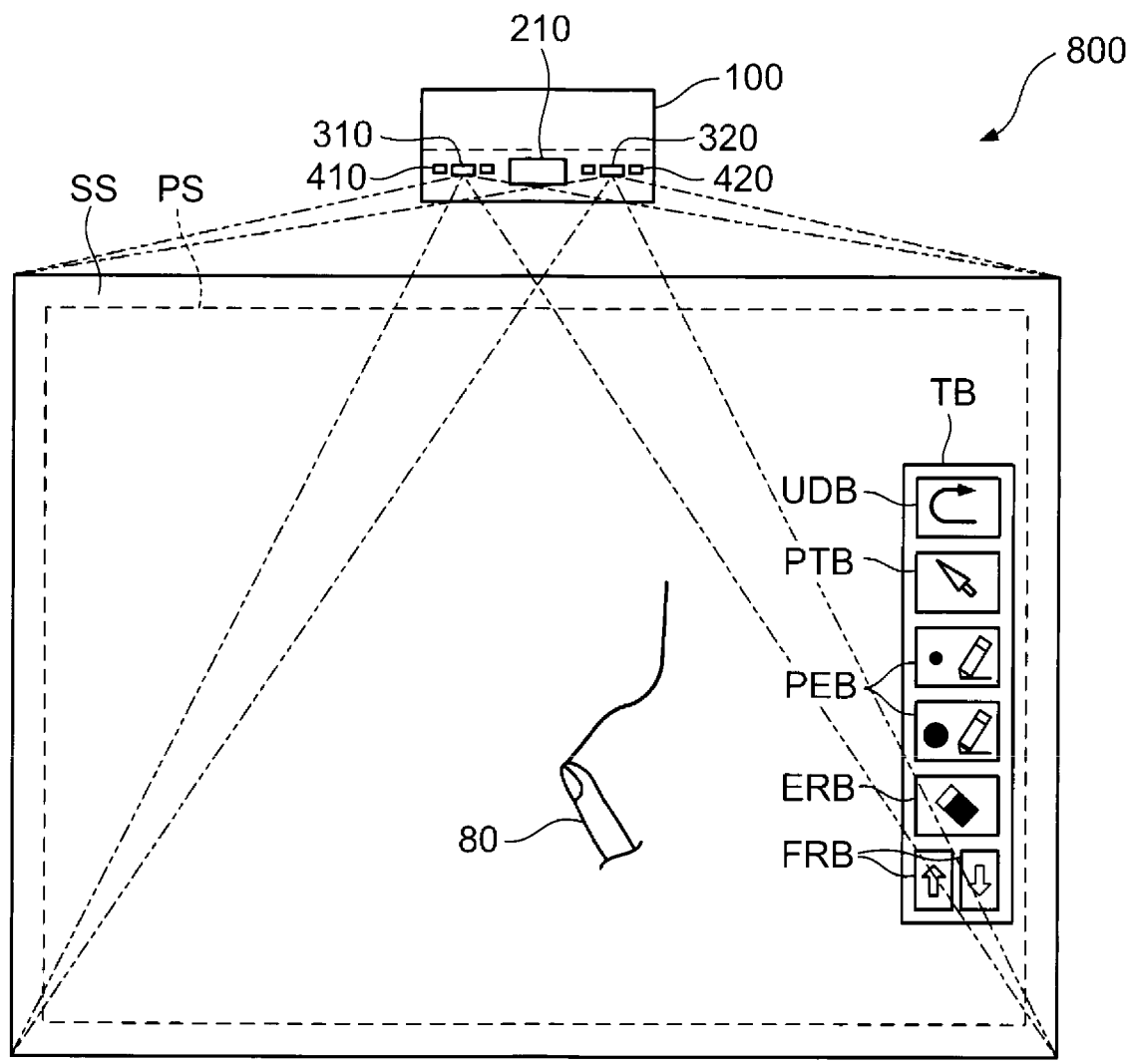
FIG. 10 is a front view of the interactive projection system.

FIG. 10 is a front view of the interactive projection system 800. The example in FIG. 10 shows the state where the interactive projection system 800 is operating in a whiteboard mode. The whiteboard mode is a mode in which the user can arbitrarily draw on the projection image PS, using the pointing unit 80. In the whiteboard mode, the projection image PS including a toolbox TB is projected on the operation surface SS. The toolbox TB includes an undo button UDB for restoring the previous processing, a pointer button PTB for selecting a mouse pointer, a pen button PEB for selecting a pen tool for drawing, an eraser button ERB for selecting an eraser tool to delete a drawn image, and a forward/back button FRB for shifting the screen forward to the next screen or back to the previous screen. The user can click on one of these buttons, using the pointing unit 80, and thus can carry out processing corresponding to the button or select a tool. The mouse pointer may be configured to be selected as a default tool immediately after the interactive projection system 800 starts up. The example in FIG. 10 shows the state where the user selects the pen tool and subsequently moves the pointing unit 80 within the projection image PS with the tip of the pointing unit 80 in contact with the operation surface SS, thus drawing a line within the projection image PS. The drawing of the line is carried out by an image processing device 500, described later.

The interactive projection system 800 can also operate in other modes than the whiteboard board. For example, the interactive projection system 800 can operate in a PC interactive mode in which an image of data transferred via a communication line from a personal computer, not illustrated, is displayed in the projection image PS. In the PC interactive mode, for example, an image of data from spreadsheet software is displayed and data can be inputted, generated, corrected or the like, using various tools and icons displayed in the image.

Figure 11:
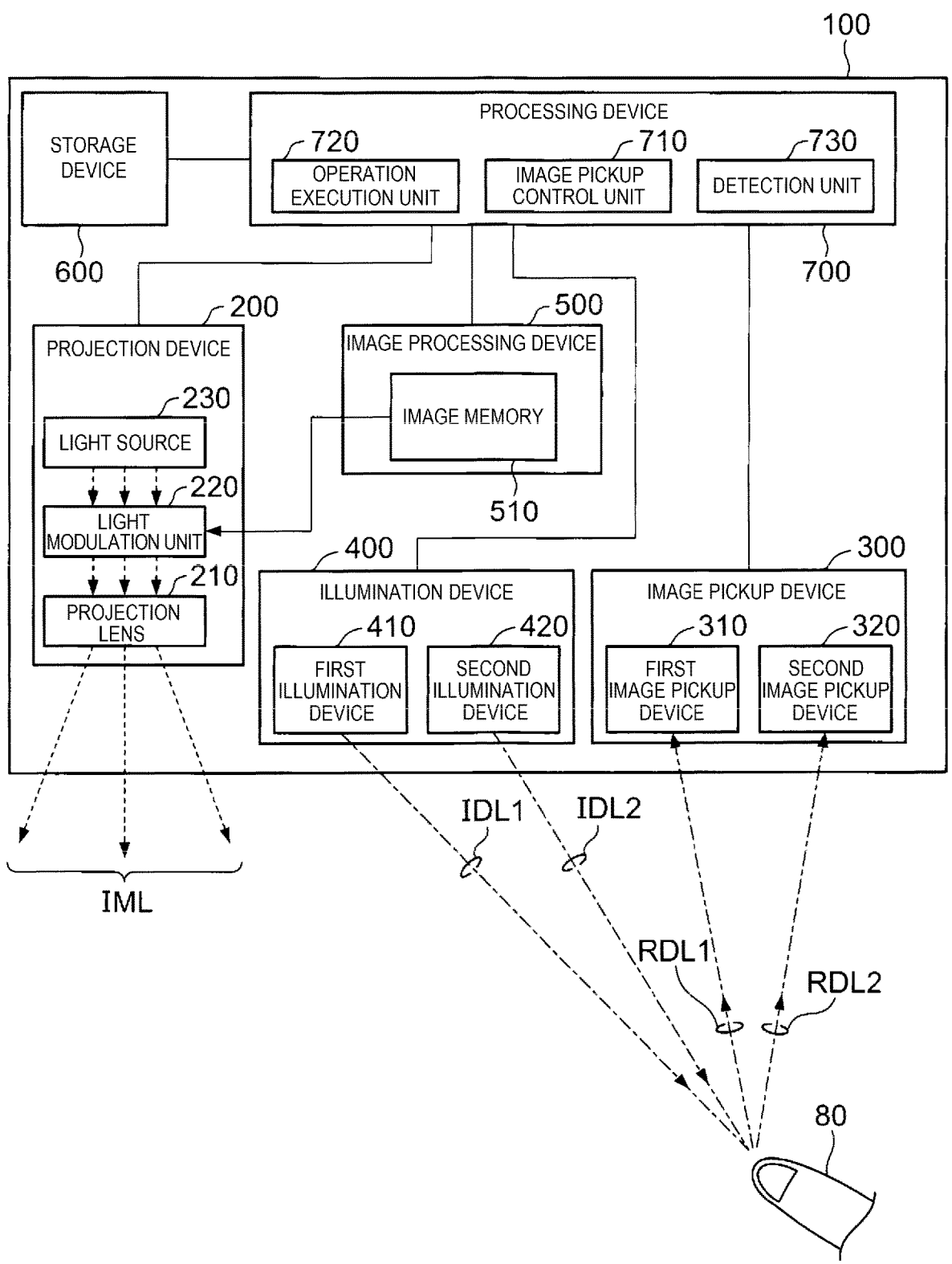
FIG. 11 is a functional block diagram showing a functional configuration example of the projector.

FIG. 11 is a functional block diagram showing a functional configuration example of the projector 100. The projector 100 has a processing device 700, a storage device 600, a projection device 200, the image processing device 500, an image pickup device 300, and an illumination device 400. The image pickup device 300 includes the first image pickup device 310 and the second image pickup device 320. The illumination device 400 includes the first illumination device 410 and the second illumination device 420.

The image processing device 500 is, for example, an image processing LSI (large-scale integrated circuit). The image processing device 500 has an image memory 510 storing projection image data representing the projection image PS projected onto the operation surface SS by the projection device 200. The image memory 510 is formed of, for example, a RAM (random-access memory). The image processing device 500 has the function of generating the projection image data. The image processing device 500 also has the function of superimposing a line drawn by the pointing unit 80 onto the projection image. Preferably, the image processing device 500 also has the function of a keystone correction unit correcting a keystone distortion of the projection image PS.

The projection device 200 has the function of projecting the projection image generated by the image processing device 500 onto the operation surface SS. The projection device 200 has the projection lens 210, a light modulation unit 220, and a light source 230. The light modulation unit 220 modulates light from the light source 230 according to the projection image data provided from the image memory 510 and thus forms projection image light IML. Typically, the projection image light IML is color image light including visible light of three colors of RGB. The projection image light IML is projected onto the operation surface SS by the projection lens 210. As the light source 230, a light source lamp such as an ultra-high-pressure mercury lamp, and various other light sources such as a light-emitting diode or laser diode can be employed. As the light modulation unit 220, a transmission-type or reflection-type liquid crystal panel, digital mirror device, or the like can be employed. Also, a plurality of light modulation units 220 corresponding to respective colors of light may be provided.

The first illumination device 410 casts the detection light IDL1 for detecting the tip of the pointing unit 80 onto the operation surface SS and over a space in front of the operation surface SS. The second illumination device 420 casts the detection light IDL2 for detecting the tip of the pointing unit 80 onto the operation surface SS and over a space in front of the operation surface SS. The detection light IDL1 is infrared light having the wavelength of 940 nm. The detection light IDL2 is infrared light having the wavelength of 850 nm.

The first image pickup device 310 has the function of receiving the light in the first wavelength range and picking up an image thereof. The second image pickup device 320 has the function of receiving the light in the second wavelength range and picking up an image thereof. The example in FIG. 11 shows the state where the detection light IDL1 and the detection light IDL2 cast by the illumination device 400 are reflected off the pointing unit 80 and then the reflected light RDL1 and the reflected light RDL2 of these detection lights are received and picked up in an image by the first image pickup device 310 and the second image pickup device 320.

The storage device 600 has a ROM (read-only memory) and a RAM. The storage device 600 stores a set value about the image quality of the projection image, information about various functions, information processed by the processing device 700, and the like. Although not illustrated in FIG. 11, the storage device 600 stores a program for causing the processing device 700 to execute the position detection method according to the present disclosure.

The processing device 700 includes, for example, a processor such as a CPU (central processing unit). The processing device 700 executes the program stored in the storage device 600 and thus controls each part of the projector 100. The processing device 700 executing the program stored in the storage device 600 functions as an image pickup control unit 710, an operation execution unit 720, and a detection unit 730. The image pickup control unit 710, the operation execution unit 720, and the detection unit 730 in this embodiment are software modules implemented by causing the processing device 700 to operate according to the program. The processing device 700 may be formed of a single processor or a plurality of processors. A part or all of the functions of the processing device 700 may be implemented by hardware such as a DSP (digital signal processor), ASIC (application-specific integrated circuit), PLD (programmable logic device), or FPGA (field-programmable gate array). The processing device 700 may be integrated with the image processing device 500.

The image pickup control unit 710 acquires an image of the pointing unit 80, using the image pickup device 300 and the illumination device 400. The detection unit 730 detects that the pointing unit 80 is in contact with the operation surface SS, by triangulation using the position of the tip of the pointing unit 80 specified based on the first picked-up image IM1 picked up using the first image pickup device 310 and the position of the tip of the pointing unit 80 specified based on the second picked-up image IM2 picked up using the second image pickup device 320. In the description below, the position of the tip of the pointing unit 80 specified based on the first picked-up image IM1 is referred to as a first position, and the position of the tip of the pointing unit 80 specified based on the second picked-up image IM2 is referred to as a second position.

To describe this in more detail, the first position and the second position coincide with each other in the state where the tip of the pointing unit 80 is in contact with the operation surface SS. Meanwhile, in the state where the tip of the pointing unit 80 is not in contact with the operation surface SS, the difference between the first position and the second position when the distance in the Z-direction between the tip of the pointing unit 80 and the operation surface SS is short is smaller than the difference between the first position and the second position when the distance in the Z-direction between the tip of the pointing unit 80 and the operation surface SS is long. Therefore, when the first position and the second position are within a predetermined range, the detection unit 730 detects that the tip of the pointing unit 80 is in contact with the operation surface SS. In this embodiment, when the contact of the pointing unit 80 with the operation surface SS is detected, the processing device 700 recognizes that an instruction by the user is given. The operation execution unit 720 recognizes the content of the instruction given on the projection image PS with the pointing unit 80 detected by the detection unit 730, and commands the image processing device 500 to generate or change a projection image according to the content of the instruction.

Figure 12:
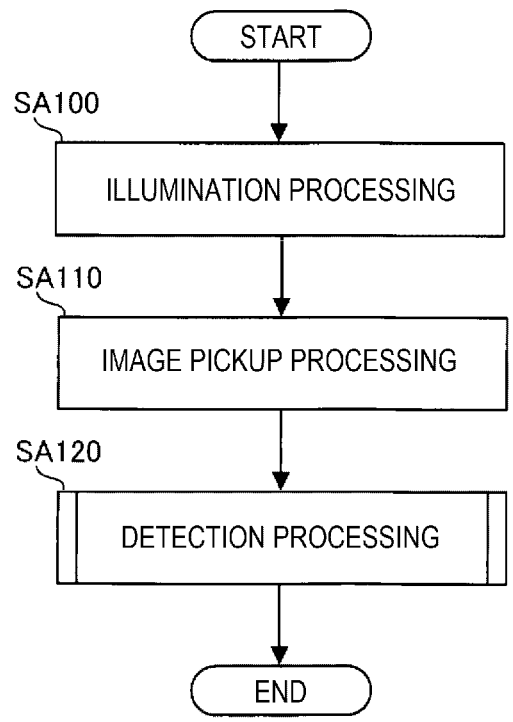
FIG. 12 is a flowchart showing a flow of a position detection method executed by a processing device included in the projector.

The processing device 700 executes the position detection method having characteristics described in the present disclosure, according to the program stored in the storage device 600. FIG. 12 is a flowchart showing the flow of this position detection method. The position detection method is repeatedly executed during the operation of the interactive projection system 800. As shown in FIG. 12, the position detection method includes illumination processing SA100, image pickup processing SA110, and detection processing SA120. The processing contents of these three kinds of processing are as follows.

In the illumination processing SA100, the processing device 700 functions as the image pickup control unit 710. In the illumination processing SA100, the processing device 700 controls the illumination device 400 to cast the detection light IDL1 and the detection light IDL2 onto the operation surface SS. As the illumination processing SA100 is executed, the detection light IDL1 and the detection light IDL2 are cast onto the operation surface SS from the illumination device 400.

In the image pickup processing SA110, the processing device 700 functions as the image pickup control unit 710. In the image pickup processing SA110, the processing device 700 controls the image pickup device 300 to pick up an image of the operation surface SS. As the image pickup processing SA110 is executed, the first picked-up image IM1 by the first image pickup device 310 and the second picked-up image IM2 by the second image pickup device 320 are acquired.

Figure 13:
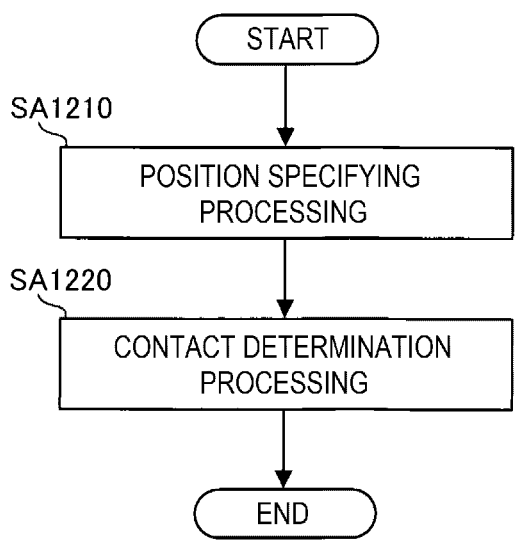
FIG. 13 is a flowchart showing a flow of detection processing included in the position detection method.

In the detection processing SA120, the processing device 700 functions as the detection unit 730. In the detection processing SA120, the processing device 700 specifies the first position and the second position, and detects that the tip of the pointing unit 80 is in contact with the operation surface SS when the first position and the second position are within a predetermined range. FIG. 13 is a flowchart showing the flow of the detection processing SA120. As shown in FIG. 13, the detection processing SA120 includes position specifying processing SA1210 and contact determination processing SA1220.

In the position specifying processing SA1210, the processing device 700 extracts a contour of the pointing unit 80 in the first picked-up image IM1, using an existing algorithm such as edge detection, and specifies the first position, which is the position of the tip of the pointing unit 80, based on the extracted contour. Similarly, the processing device 700 extracts a contour of the pointing unit 80 in the second picked-up image IM2, using an existing algorithm such as edge detection, and specifies the second position, which is the position of the tip of the pointing unit 80, based on the extracted contour. In the contact determination processing SA1220, the processing device 700 determines whether the first position and the second position specified in the position specifying processing SA1210 are within a predetermined range or not. The processing device 700 detects the contact of the tip of the pointing unit 80 with the operation surface SS when these positions are within the predetermined range.

As described, in this embodiment, using an image without a shadow of the tip of the pointing unit 80 in the first picked-up image IM1 and an image without a shadow of the tip of the pointing unit 80 in the second picked-up image IM2, the first position is specified, based on the area other than the shadow in the first picked-up image IM1, and the second position is specified, based on the area other than the shadow in the second picked-up image IM2. Therefore, according to this embodiment, the accuracy of detecting the position of the tip of the pointing unit 80 can be improved and therefore the accuracy of detecting the contact of the tip of the pointing unit 80 with the operation surface SS can be improved.

2. Second Embodiment

Figure 14:
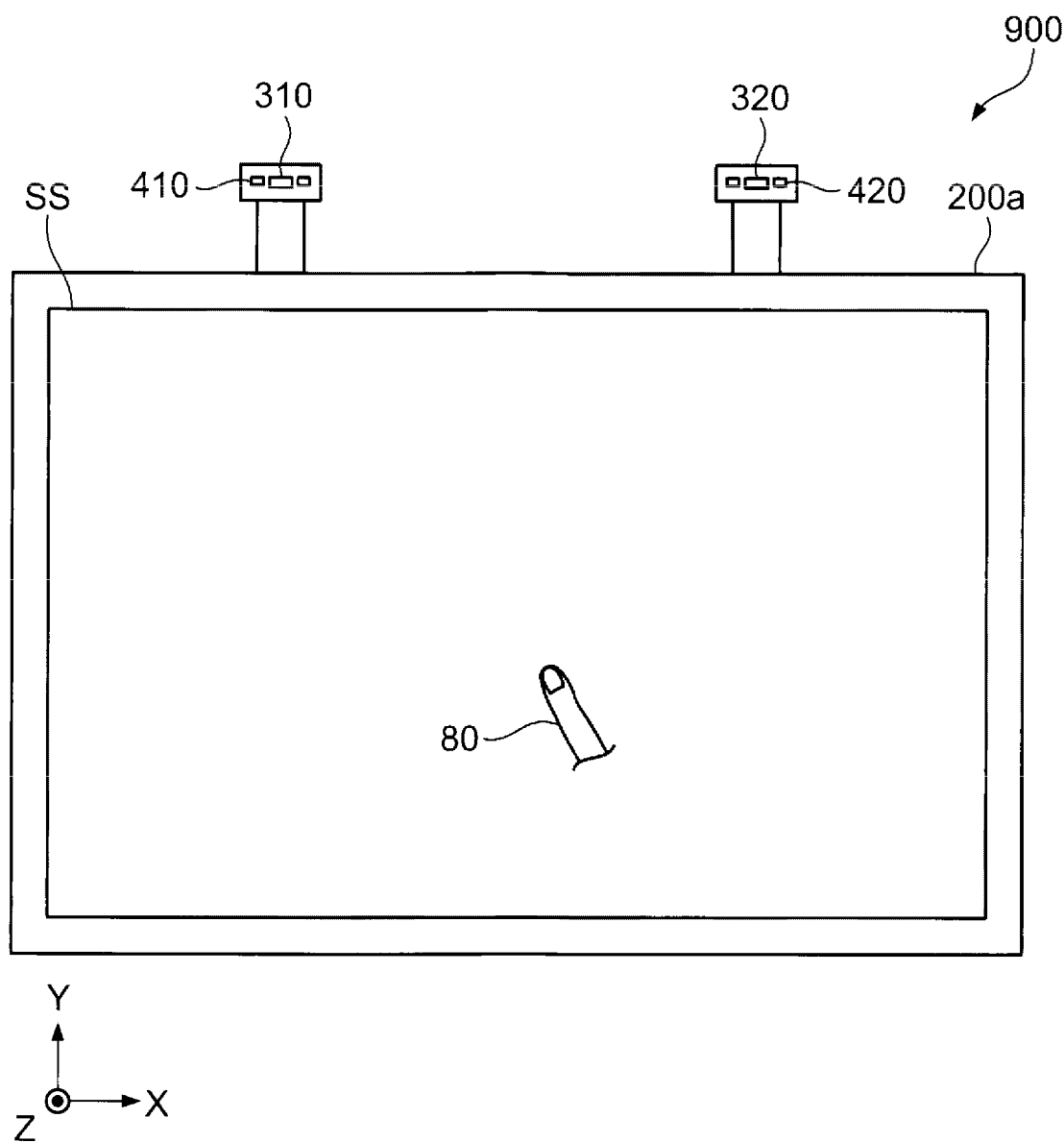
FIG. 14 is a front view of a position detection device according to a second embodiment of the present disclosure.

FIG. 14 is a front view of a position detection device 900 according to a second embodiment. The position detection device 900 has an image display panel 200a, two cameras, that is, a first image pickup device 310 and a second image pickup device 320 picking up an image including a pointing unit 80, and a first illumination device 410 and a second illumination device 420 casing infrared light for detecting the pointing unit 80. The configurations of the first image pickup device 310, the second image pickup device 320, the first illumination device 410, and the second illumination device 420 are the same as those in the first embodiment. The image display panel 200a is a so-called flat panel display. The image display surface of the image display panel 200a is equivalent to the operation surface SS.

Figure 15:
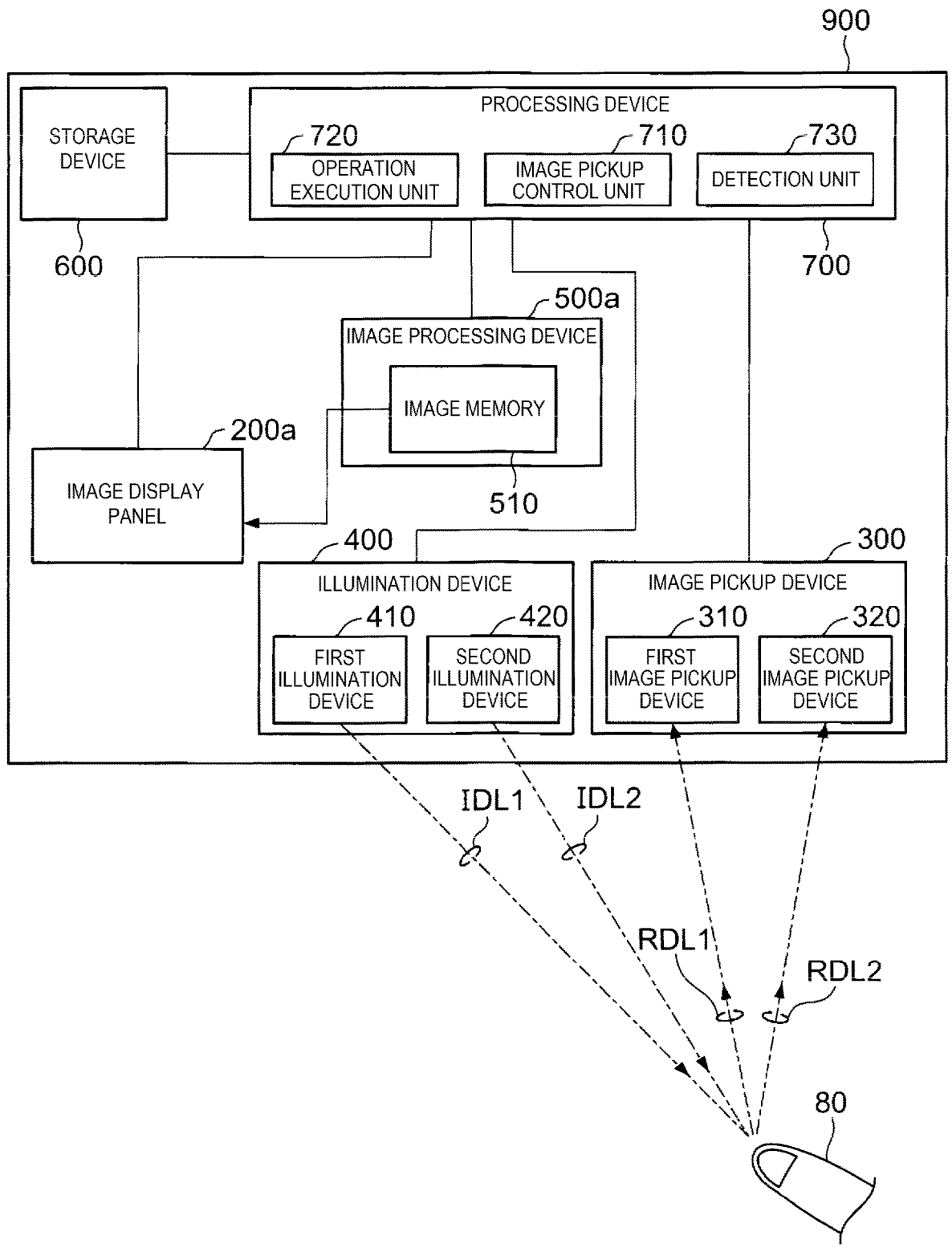
FIG. 15 is a functional block diagram showing a functional configuration example of the position detection device.

FIG. 15 is a functional block diagram of the position detection device 900. The position detection device 900 has the same configuration as the projector 100 shown in FIG. 8, except for having the image display panel 200a instead of the projection device 200, and having an image processing device 500a instead of the image processing device 500. The position detection method in the position detection device 900 is similar to the processing in the first embodiment described with reference to FIG. 12 and therefore will not be described further. The second embodiment has effects similar to those of the first embodiment.

3. Modification Examples

The first embodiment and the second embodiment may be modified in the following manner.

(1) The wavelength ranges for the first light and the second light may be cancelled. The first illumination device 410 may be configured to emit right-handed circularly polarized infrared light. The second illumination device 420 may be configured to emit left-handed circularly polarized infrared light. In this case, the first filter 312 of the first image pickup device 310 may be configured to transmit the right-handed circularly polarized infrared light and not transmit the left-handed circularly polarized infrared light. The second filter 322 of the second image pickup device 320 may be configured to transmit the left-handed circularly polarized infrared light and not transmit the right-handed circularly polarized infrared light. The right-handed circularly polarized light is an example of light in a first polarized state. The left-handed circularly polarized light is an example of light in a second polarized state which is different from the first polarized state. The light in the first polarized state is an example of the first light according to the present disclosure. The light in the second polarized state is an example of the second light which is different from the first light. In this configuration, the first image pickup device 310 picks up the first picked-up image IM1 of the reflected light RDL1 that is right-handed circularly polarized light, and the second image pickup device 320 picks up the second picked-up image IM2 of the reflected light RDL2 that is left-handed circularly polarized light. Therefore, this configuration has effects similar to those of the first embodiment and the second embodiment.

(2) A program causing a general computer to execute the position detection method shown in FIG. 12 may be manufactured and distributed as a single program. As a specific method for distributing the program, writing the program into a computer-readable recording medium such as a flash ROM (read-only memory) and distributing the recording medium, or distributing the program by downloading via a telecommunications line such as the internet, may be employed.

4. Form Grasped From at Least One of Embodiments and Modification Examples

The present disclosure is not limited to the above embodiments and modification examples and can be implemented in various other forms without departing from the spirit and scope of the present disclosure. For example, the present disclosure can be implemented according to the forms given below. A technical feature in the embodiments corresponding to a technical feature in the respective forms described below can be suitably replaced or combined with another, in order to solve a part or all of the problems described in the present disclosure, or in order to achieve a part or all of the effects of the present disclosure. The technical feature can be suitably deleted unless described as essential in this specification.

A form of the above position detection device has an illumination device, a first image pickup device, a second image pickup device, and a detection device. The illumination device casts first light and second light that is different from the first light, onto an operation surface and an object. The first image pickup device picks up an image of the operation surface and the object and has a higher sensitivity to the first light than to the second light. The second image pickup device picks up an image of the operation surface and the object and is arranged at a different position from the first image pickup device. The second image pickup device has a higher sensitivity to the second light than to the first light. The detection device detects that the object is in contact with the operation surface when a position of the object specified based on a first picked-up image picked up using the first image pickup device and a position of the object specified based on a second picked-up image picked up using the second image pickup device are within a predetermined range. This configuration can improve the accuracy of detecting the position of the object and can improve the accuracy of detecting the contact of the object with the operation surface.

As a form of the position detection device, the first image pickup device may have a first filter transmitting the first light and not transmitting the second light, and may pick up an image of reflected light of the first light reflected off the operation surface and the object and acquire the first picked-up image. The second image pickup device may have a second filter transmitting the second light and not transmitting the first light, and may pick up an image of reflected light of the second light reflected off the operation surface and the object and acquire the second picked-up image. The first light and the second light may be infrared light in different wavelength ranges from each other.

As a form of the position detection device, the illumination device may have a first illumination device including at least one of a first coaxial illumination device or a first ambient illumination device, and a second illumination device including at least one of a second coaxial illumination device or a second ambient illumination device. The first coaxial illumination device may illuminate with the first light coaxially with an optical axis of the first image pickup device. The first ambient illumination device may be arranged in such a way as to surround the optical axis of the first image pickup device and emit the first light. The second coaxial illumination device may illuminate with the second light coaxially with an optical axis of the second image pickup device. The second ambient illumination device may be arranged in such a way as to surround the optical axis of the second image pickup device and emit the second light. According to this configuration, the generation of a shadow of the object by the light cast onto the operation surface from the illumination device can be avoided as much as possible.

A form of the projector has an illumination device, a first image pickup device, a second image pickup device, a detection device, and a projection device. The illumination device casts first light and second light that is different from the first light, onto an operation surface and an object. The first image pickup device picks up an image of the operation surface and the object and has a higher sensitivity to the first light than to the second light. The second image pickup device picks up an image of the operation surface and the object and is arranged at a different position from the first image pickup device. The second image pickup device has a higher sensitivity to the second light than to the first light. The detection device detects that the object is in contact with the operation surface when a position of the object specified based on a first picked-up image picked up using the first image pickup device and a position of the object specified based on a second picked-up image picked up using the second image pickup device are within a predetermined range. The projection device projects a projection image via visible light onto the operation surface. This configuration can improve the accuracy of detecting the position of the object and can improve the accuracy of detecting the contact of the object with the operation surface.

As a form of the projector, the first light may include first infrared light. The second light may include second infrared light that is different from the first infrared light. The first image pickup device may have a first filter transmitting the first infrared light and not transmitting the second infrared light, and a first camera picking up an image of reflected light reflected off the operation surface and the object via the first filter and thus outputting the first picked-up image. The second image pickup device may have a second filter not transmitting the first infrared light and transmitting the second infrared light, and a second camera arranged at a different position from the first camera and picking up an image of reflected light reflected off the operation surface and the object via the second filter and thus outputting the second picked-up image. The illumination device may have a first illumination device emitting the first infrared light to the operation surface and the object along an optical axis of the first camera and not emitting the second infrared light, and a second illumination device emitting the second infrared light to the operation surface and the object along an optical axis of the second camera and not emitting the first infrared light.

As a form of the projector, the illumination device may have a first illumination device including at least one of a first coaxial illumination device or a first ambient illumination device, and a second illumination device including at least one of a second coaxial illumination device or a second ambient illumination device. The first coaxial illumination device may illuminate with the first light coaxially with an optical axis of the first image pickup device. The first ambient illumination device may be arranged in such a way as to surround the optical axis of the first image pickup device and emit the first light. The second coaxial illumination device may illuminate with the second light coaxially with an optical axis of the second image pickup device. The second ambient illumination device may be arranged in such a way as to surround the optical axis of the second image pickup device and emit the second light. According to this configuration, the generation of a shadow of the object by the light cast onto the operation surface from the illumination device can be avoided as much as possible.

A form of the position detection method includes irradiation processing, image pickup processing, and detection processing. In the irradiation processing, first light and second light that is different from the first light are cast onto an operation surface and an object. In the image pickup processing, an image of the operation surface and the object is picked up by a first image pickup device having a higher sensitivity to the first light than to the second light, and an image of the operation surface and the object is picked up by a second image pickup device having a higher sensitivity to the second light than to the first light, from a different direction from a position of the first image pickup device. In the detection processing, it is detected that the object is in contact with the operation surface when a position of the object specified based on a first picked-up image picked up using the first image pickup device and a position of the object specified based on a second picked-up image picked up using the second image pickup device are within a predetermined range. This configuration can improve the accuracy of detecting the position of the object and can improve the accuracy of detecting the contact of the object with the operation surface.

As a form of the position detection method, the first image pickup device may transmit the first light, not transmit the second light, pick up an image of reflected light of the first light reflected off the operation surface and the object, and acquire the first picked-up image. The second image pickup device may transmit the second light, not transmit the first light, pick up an image of reflected light of the second light reflected off the operation surface and the object, and acquire the second picked-up image. The first light and the second light may be infrared light in different wavelength ranges from each other.

As a form of the position detection method, coaxial illumination with the first light coaxial with an optical axis of the first image pickup device or ambient illumination to emit the first light in such a way as to surround the optical axis of the first image pickup device may be performed, and coaxial illumination with the second light coaxial with an optical axis of the second image pickup device or ambient illumination to emit the second light in such a way as to surround the optical axis of the second image pickup device may be performed. According to this configuration, the generation of a shadow of the object by the light cast onto the operation surface from the illumination device can be avoided as much as possible.

What is claimed is:

1. A position detection device comprising:
   an illumination device casting first light and second light that is different from the first light, onto an operation surface and an object;
   a first image pickup device picking up an image of the operation surface and the object and having a higher sensitivity to the first light than to the second light;
   a second image pickup device picking up an image of the operation surface and the object and arranged at a different position from the first image pickup device, the second image pickup device having a higher sensitivity to the second light than to the first light; and
   a detection device detecting that the object is in contact with the operation surface when a position of the object specified based on a first picked-up image picked up using the first image pickup device and a position of the object specified based on a second picked-up image picked up using the second image pickup device are within a predetermined range.

2. The position detection device according to claim 1, wherein
   the first image pickup device has a first filter transmitting the first light and not transmitting the second light, and picks up an image of reflected light of the first light reflected off the operation surface and the object and acquires the first picked-up image,
   the second image pickup device has a second filter transmitting the second light and not transmitting the first light, and picks up an image of reflected light of the second light reflected off the operation surface and the object and acquires the second picked-up image, and
   the first light and the second light are infrared light in different wavelength ranges from each other.

3. The position detection device according to claim 1, wherein
the illumination device has
a first illumination device including at least one of a first coaxial illumination device illuminating with the first light coaxially with an optical axis of the first image pickup device, or a first ambient illumination device arranged in such away as to surround the optical axis of the first image pickup device and emitting the first light, and
a second illumination device including at least one of a second coaxial illumination device illuminating with the second light coaxially with an optical axis of the second image pickup device, or a second ambient illumination device arranged in such a way as to surround the optical axis of the second image pickup device and emitting the second light.

4. A projector comprising:
an illumination device casting first light and second light that is different from the first light, onto an operation surface and an object;
a first image pickup device picking up an image of the operation surface and the object and having a higher sensitivity to the first light than to the second light;
a second image pickup device picking up an image of the operation surface and the object and arranged at a different position from the first image pickup device, the second image pickup device having a higher sensitivity to the second light than to the first light;
a detection device detecting that the object is in contact with the operation surface when a position of the object specified based on a first picked-up image picked up using the first image pickup device and a position of the object specified based on a second picked-up image picked up using the second image pickup device are within a predetermined range; and
a projection device projecting a projection image via visible light onto the operation surface.

5. The projector according to claim 4, wherein
the first light includes first infrared light, and the second light includes second infrared light that is different from the first infrared light,
the first image pickup device has
a first filter transmitting the first infrared light and not transmitting the second infrared light, and
a first camera picking up an image of reflected light reflected off the operation surface and the object via the first filter and thus outputting the first picked-up image,
the second image pickup device has
a second filter not transmitting the first infrared light and transmitting the second infrared light, and
a second camera arranged at a different position from the first camera and picking up an image of reflected light reflected off the operation surface and the object via the second filter and thus outputting the second picked-up image, and
the illumination device has
a first illumination device emitting the first infrared light to the operation surface and the object along an optical axis of the first camera and not emitting the second infrared light, and
a second illumination device emitting the second infrared light to the operation surface and the object along an optical axis of the second camera and not emitting the first infrared light.

6. The projector according to claim 4, wherein
the illumination device has
a first illumination device including at least one of a first coaxial illumination device illuminating with the first light coaxially with an optical axis of the first image pickup device, or a first ambient illumination device arranged in such away as to surround the optical axis of the first image pickup device and emit the first light, and
a second illumination device including at least one of a second coaxial illumination device illuminating with the second light coaxially with an optical axis of the second image pickup device, or a second ambient illumination device arranged in such a way as to surround the optical axis of the second image pickup device and emit the second light.

7. A position detection method comprising:
casting first light and second light that is different from the first light, onto an operation surface and an object;
picking up an image of the operation surface and the object by a first image pickup device having a higher sensitivity to the first light than to the second light, and picking up an image of the operation surface and the object by a second image pickup device having a higher sensitivity to the second light than to the first light, from a different direction from a position of the first image pickup device; and
detecting that the object is in contact with the operation surface when a position of the object specified based on a first picked-up image picked up using the first image pickup device and a position of the object specified based on a second picked-up image picked up using the second image pickup device are within a predetermined range.

8. The position detection method according to claim 7, wherein
the first image pickup device transmits the first light, does not transmit the second light, picks up an image of reflected light of the first light reflected off the operation surface and the object, and acquires the first picked-up image,
the second image pickup device transmits the second light, does not transmit the first light, picks up an image of reflected light of the second light reflected off the operation surface and the object, and acquires the second picked-up image, and
the first light and the second light are infrared light in different wavelength ranges from each other.

9. The position detection method according to claim 7, wherein
coaxial illumination with the first light coaxial with an optical axis of the first image pickup device or ambient illumination to emit the first light in such a way as to surround the optical axis of the first image pickup device is performed, and
coaxial illumination with the second light coaxial with an optical axis of the second image pickup device or ambient illumination to emit the second light in such a way as to surround the optical axis of the second image pickup device is performed.

* * * * *